(12) United States Patent
Ogaki et al.

(10) Patent No.: US 11,087,523 B2
(45) Date of Patent: Aug. 10, 2021

(54) PRODUCTION RAY TRACING OF FEATURE LINES

(71) Applicant: Autodesk, Inc., San Rafael, CA (US)

(72) Inventors: Shinji Ogaki, Tokyo (JP); Iliyan Georgiev, London (GB)

(73) Assignee: AUTODESK, INC., San Rafael, CA (US)

( * ) Notice: Subject to any disclaimer, the term of this patent is extended or adjusted under 35 U.S.C. 154(b) by 0 days.

(21) Appl. No.: 16/665,577

(22) Filed: Oct. 28, 2019

(65) Prior Publication Data

US 2020/0134905 A1 Apr. 30, 2020

Related U.S. Application Data

(60) Provisional application No. 62/751,300, filed on Oct. 26, 2018.

(51) Int. Cl.
*G06T 15/06* (2011.01)
*G06T 19/20* (2011.01)
*G06T 15/00* (2011.01)

(52) U.S. Cl.
CPC .......... *G06T 15/06* (2013.01); *G06T 15/005* (2013.01); *G06T 19/20* (2013.01); *G06T 2219/2012* (2013.01)

(58) Field of Classification Search
CPC ....... G06T 15/06; G06T 15/005; G06T 19/20; G06T 2219/2012
See application file for complete search history.

(56) References Cited

U.S. PATENT DOCUMENTS

| | | | | |
|---|---|---|---|---|
| 6,559,858 B1* | 5/2003 | Schneider | ............. | G06T 11/001 345/173 |
| 6,747,642 B1* | 6/2004 | Yasumoto | ............... | G06T 15/02 345/419 |
| 8,730,258 B1* | 5/2014 | Cornell | ................. | G06T 11/203 345/611 |
| 2020/0205723 A1* | 7/2020 | Massey | ................. | A61B 5/444 |

OTHER PUBLICATIONS

Bauer, A., "A New Contour Method for Highly Detailed Geometry", Proceedings of SIGGRAPH '17 Talks, Jul. 30-Aug. 3, 2017, pp. 1-2.
Bukenberger, D.R., et al., "Stereo-Consistent Contours in Object Space", Computer Graphics forum, 2018, pp. 301-312, vol. 37, No. 1.

(Continued)

*Primary Examiner* — Haixia Du
(74) *Attorney, Agent, or Firm* — Gates & Cooper LLP

(57) ABSTRACT

A computer-implemented method and system provide the ability to draw a feature line on an image. An image is acquired and is represented as a set of pixel samples for every pixel in the image, with each pixel sample including one or more feature attributes. One or more features are detected based on differences between the feature attributes. The detected features are represented by pixel samples. A color of the pixel samples representing the detected features is altered. The image is rendered based on the pixel samples including the altered color, and the feature line includes the altered color.

20 Claims, 7 Drawing Sheets

(56) References Cited

OTHER PUBLICATIONS

Choudhury, A.N.M.I., et al., "Ray Tracing NPR-Style Feature Lines", Proceedings of the 7th International Symposium on Non-Photorealistic Animation and Rendering, 2009, pp. 5-14.
Cook, R.L., et al., "Stochastic Simplification of Aggregate Detail", ACM Transactions on Graphics, Jul. 2007, pp. 1-8.
Georgiev, I., et al., "Arnold: A Brute-Force Production Path Tracer", ACM Transactions on Graphics, Jul. 2018, pp. 1-12, vol. 37, No. 3, Article 32.
Grabli, S., et al., "Programmable Style for NPR Line Drawing", Proceedings of the Fifteenth Eurographics conference on Rendering Techniques, Jun. 2004, pp. 33-44.
Hertzmann, A., et al., "Illustrating Smooth Surfaces", SIGGRAPH '00: Proceedings of the 27th Annual Conference on Computer Graphics and Interactive Techniques, Jul. 2000, pp. 517-526.
Kim, Y., et al., "Lineart Illustration of Dynamic and Specular Surfaces", ACM SIGGRAPH Asia 2008 Papers, pp. 1-10.
Wald, I., et al., "Robust Iterative Find-Next-Hit Ray Traversal", Eurographics Symposium on Parallel Graphics and Visualization, 2018, pp. 1-8.

\* cited by examiner

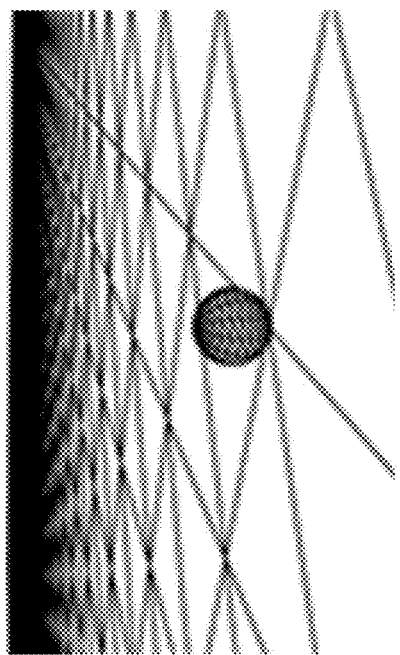
FIG. 1A
(PRIOR ART)
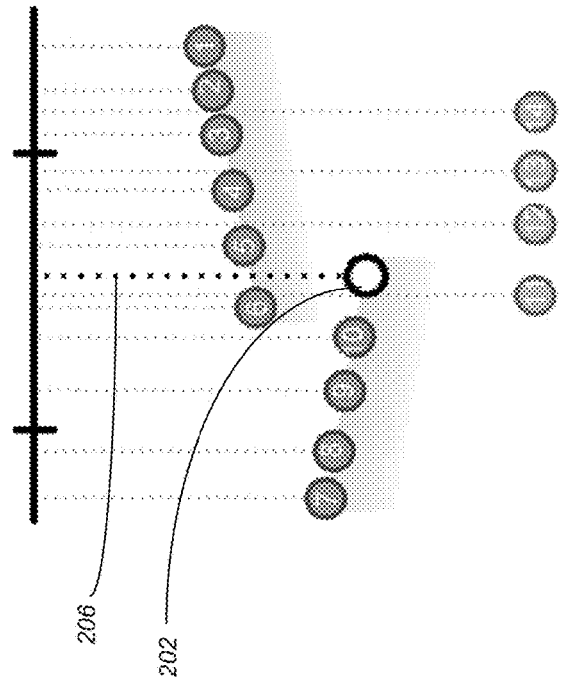
FIG. 1B
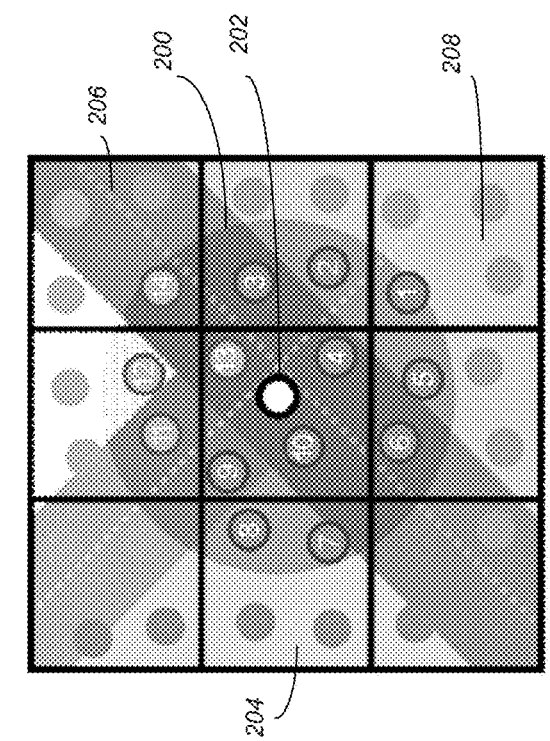
FIG. 2A
FIG. 2B

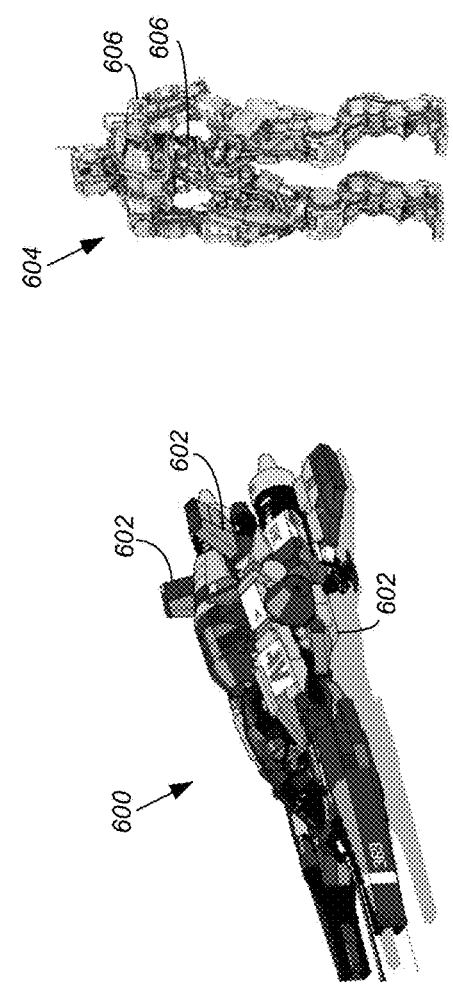
FIG. 6A
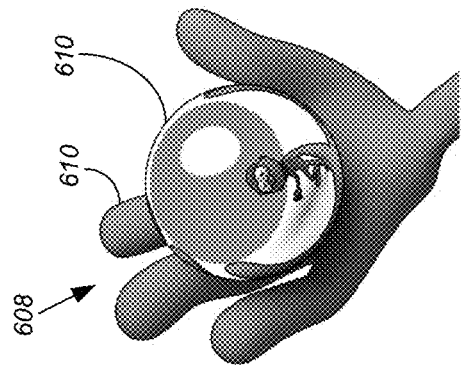
FIG. 6B
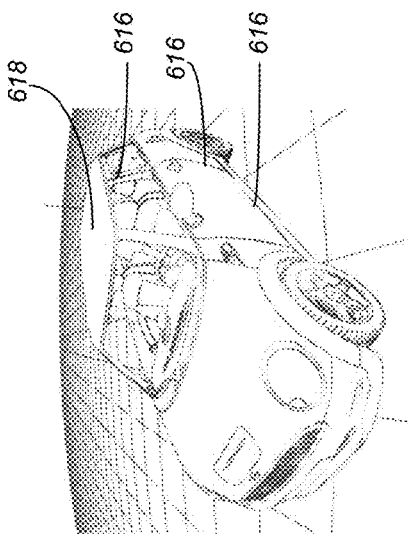
FIG. 6C
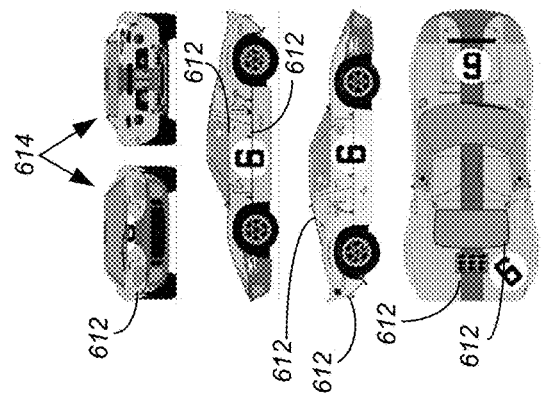
FIG. 6D
FIG. 6E

PRODUCTION RAY TRACING OF FEATURE LINES

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 62/751,300, filed on Oct. 26, 2018, with inventor(s) Shinji Ogaki and Iliyan A. Georgiev, entitled "PRODUCTION RAY TRACING OF FEATURE LINES,".

BACKGROUND OF THE INVENTION

1. Field of the Invention

The present invention relates generally to image rendering, and in particular, to a system, method, apparatus, and article of manufacture for drawing/rendering feature lines of complex objects.

2. Description of the Related Art (Note: This application references a number of different publications as indicated throughout the specification by author reference names enclosed in brackets, e.g., [Smith]. A list of these different publications ordered according to these author reference names can be found below in the section entitled "References." Each of these publications is incorporated by reference herein.)

Automated feature line drawing of virtual three-dimensional (3D) objects helps artists depict shapes and allows for creating stylistic rendering effects. Feature line drawing consists of drawing lines over/around various portions of objects in an image. High-fidelity drawing of lines that are very thin or have varying thickness and color, or lines of recursively reflected and refracted objects, is a challenging task.

Two general approaches exist for drawing feature lines of rendered 3D objects: image-space based and object-space based. Image-space methods are compatible with both rasterization and ray tracing and work as a post-process on the pixel samples. Their main advantage is that their performance is independent of the geometry tessellation rate. Image-space methods also allow for drawing contour lines of reflected and refracted objects. One of the drawbacks of image-space methods is that varying the style along the lines is difficult, e.g. for emulating thick-to-thin ink strokes, which requires a distance parameterization along the drawn lines. On the other hand, object-space line drawing is well-suited for controlling stroke styles like scumbling and for rendering motion lines. However, object-based methods do not easily support arbitrary camera projections and have difficulties with reflection and refraction. While object-based methods can handle thin or small objects well, their performance decreases in proportion to the number of polygons being drawn.

Modern ray-tracing production renderers must often handle enormous amounts of geometry and must support arbitrary shaders and camera projections. However, prior art methods fail to provide the ability to vary the line width and color, and/or to handle intersections of lines with different styles. Another limitation of prior art image-space contour drawing is the large amount of samples required to render thin lines without excessive aliasing and/or noise.

To better understand the problems describe above, an overview of prior art line drawing methodologies may be useful.

The line drawing method of Choudhury and Parker [2009] [Choudhury] integrates well into a ray tracing framework, but its use is limited to constant line width and color, and can produce artifacts where several contours meet (see below). Choudhury's feature detection metric also involves evaluating a number of additional "probe" samples for every pixel sample, which adds redundant computation and can become prohibitively expensive with the high pixel sampling rates used in production rendering.

Kim et al. [2008] [Kim] proposed a stroke direction propagation algorithm that uses multi-perspective projections to render reflections and refractions in a line-art style. However, such an approach only considers single reflection and double refraction.

Bauer [2017] [Bauer] addressed temporal flickering, which is a common issue in contour drawing. Bauer's algorithm accumulates a high-resolution sub-pixel contour image as samples are taken, according to the specifics of the rendering system it is tailored to. The feature detection and the progressive refinement nature of the method result in sub-optimal contour fidelity. Moreover, it is not clear how to vary the stroke style or handle contour intersections consistently with Bauer's approach.

Grabli et al. [2004] [Grabli] introduced a flexible framework that allows for controlling the line style via custom shaders. They adopt the edge extraction algorithm of Hertzmann and Zorin [2000] [Hertzmann] which operates in object space, making it difficult to support reflection and refraction.

In view of the above, it is desirable to provide a method and system that overcomes the deficiencies of the prior art.

SUMMARY OF THE INVENTION

Embodiments of the invention provide an image-based feature detection and line drawing method that integrates naturally into a ray tracing renderer and runs as a post-process, after the pixel sampling stage. Embodiments of the invention support arbitrary camera projections and surface shaders, and performance is not dependent on the geometric complexity of the scene but on the pixel sampling rate. By leveraging various attributes stored in every pixel sample, which are typically available in production renderers, e.g. for arbitrary output variables (AOVs), feature lines of reflected and refracted objects can be obtained with relative ease. The color and width of the lines can be driven by the surface shaders, which allows for achieving a wide variety of artistic styles.

Embodiments of the invention provide a contour rendering method that operates in image space, which is well suited for modern ray-tracing production renderers that must often handle large amounts of geometry and support arbitrary shaders and camera projections. Further, embodiments of the invention can draw outlines of reflected and refracted objects, which is important for film production as well as scientific illustrations. In addition, embodiments of the invention allow surface shaders to control the stroke style, and render line intersections accurately via an image-space ray tracing approach. Further, embodiments of the invention address the prior art limitation requiring a large amount of samples (to render thin lines without excessive aliasing and/or noise) by imposing a minimum image-space line width that preserves the contour appearance.

BRIEF DESCRIPTION OF THE DRAWINGS

Referring now to the drawings in which like reference numbers represent corresponding parts throughout:

FIG. 1A illustrates how the prior art fails to consider line intersections and produces conspicuous aliasing;

FIG. 1B illustrates a correct rendering of line intersections without conspicuous aliasing in accordance one or more embodiments of the invention;

FIGS. 2A and 2B illustrate the testing of every pixel sample for feature line intersection by inspecting the samples in a circular neighborhood around it in accordance with one or more embodiments of the invention;

FIGS. 6A-6E showcase exemplary capabilities of implementations in a production ray tracer in accordance with one or more embodiments of the invention;

DETAILED DESCRIPTION OF THE PREFERRED EMBODIMENTS

Figure 3A:
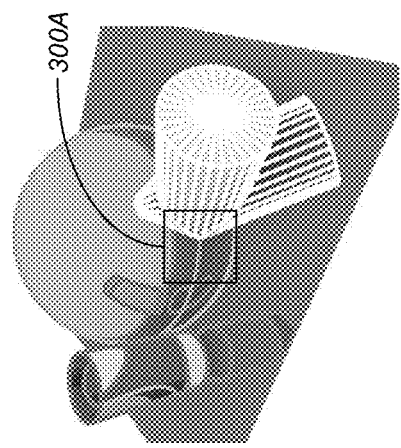
FIG. 3A-3C illustrate a precedence of user set priorities for determining sample priority in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide the ability to augment a ray-traced image with lines along certain features: object silhouettes, intersections between objects, and creases (i.e. regions of high surface curvature). Additionally, embodiments enable surface shaders to define custom features.

Embodiments of the invention may target integration into a production renderer, which produces a high-quality image by taking a large number of ray samples per pixel. Embodiments may perform the contour drawing in image space as a post-process effect so as to avoid invasive modifications to the renderer. To this end, embodiments may take advantage of the dense image sampling and perform feature detection based solely on comparing geometric and shading attributes readily stored in the payloads of pixel samples. Every sample that lies on a feature line has its color changed to the color of the line. All samples are then fed to the pixel filter for final averaging, as usual. Details for these steps are described below.

Feature and Line Attributes

A feature region in the image is one where the visible scene geometry changes rapidly. To detect such changes, embodiments of the invention look for variations in the feature attributes of adjacent pixel samples. Four such attributes are readily supplied by the renderer: object ID, shader ID, texture coordinate, and surface normal. An additional "feature color" may be output from shaders at every surface point. This additional attribute is quite versatile: for example, a shader can assign a different constant color to every polygon or black/white colors corresponding to the object's shadowed/lit regions. Embodiments of the invention will then detect the edges in this output and draw corresponding lines, e.g. along polygon edges or shadow boundaries.

At every surface point, shaders can also optionally output line attributes: color and thickness. These override the user-specified global line attributes and allow for creating style variations along the feature lines, e.g. driven by textures or the illumination.

Feature Detection and Line Shading

Image-space methods draw lines by altering the colors of pixel samples that lie near features edges. Traditionally this is done by blending between the input ray-traced color and the line color, based on the feature strength and/or the sample's image-space proximity to the feature edge (Bauer 2017 [Bauer]; Choudhury and Parker 2009 [Choudhury]). While good for anti-aliasing, this approach has difficulties handling varying stroke styles and line intersections, and it is also prone to producing artifacts. For example, the edge strength metric of [Choudhury] assumes that a pixel sample can lie near at most one, straight feature edge, causing unnatural brightening in regions with curved edges, or where several edges meet as illustrated in FIG. 1A. In this regard, FIG. 1A illustrates how the prior art fails to consider line intersections and produces conspicuous aliasing. In contrast, FIG. 1B illustrates a correct rendering of line intersections without conspicuous aliasing in accordance one or more embodiments of the invention.

Embodiments of the invention provide an accurate rendering by treating the feature lines as opaque pieces of geometry that, even though defined and drawn in image space, are attached to the 3D scene objects and can therefore intersect and occlude each other. A pixel sample can then "see" only the topmost of potentially several overlapping lines. Every sample is tested for line intersection by performing a ray-tracing-like operation in image space.

Given a sample, henceforth referred to as target sample, embodiments of the invention look for potential feature line intersections by comparing the target's five feature attributes to those of every other sample in its vicinity, henceforth called neighbor samples. FIGS. 2A and 2B illustrate the testing of every pixel sample for feature line intersection by inspecting the samples in a circular neighborhood 200 around it (FIG. 2A) in front-to-back order (FIG. 2B). In FIGS. 2A and 2B, the target sample 202 hits a first object 204 but lies on the silhouette line 206 of a second object 208; the samples 11, 12, 13, and 14 do not intersect any geometry. As illustrated, samples 7, 8, 9, and 10 intersect with the first object 204, while samples 1-6 intersect with the second object 208.

The neighborhood 200 is a disk-shaped stencil, illustrated in FIG. 2A with a diameter equal to the maximum possible line width, which is specified by the user. If a neighbor sample 1-14 has an attribute sufficiently different from that of the target 202, according to a user-specified threshold, then the target sample 202 potentially lies on a feature line. For different attributes, different thresholds may be utilized to determine if the neighbor sample 1-14 is different. For example, for texture coordinates, the texture-space distance may be thresholded; for normal, the angle may be thresholded; and for the feature color difference, each color channel (and/or an average or other color distance measurement) may be thresholded.

To obtain a valid line intersection, the image-space distance to the neighbor sample must be smaller than half the width of the tested line. The target and the neighbor samples will generally have different line widths defined by their corresponding surface shaders. One of the two samples should take priority in specifying the line attributes, and by default this is the one with the shorter ray hit distance. This ensures that the correct silhouette lines of every object are drawn, as styled by its associated shader, on top of the objects behind it.

Since one only needs to find the closest line intersection at the target sample 202, embodiments of the invention may iterate over the target-neighbor pairs in order of decreasing priority, i.e. by the depth of the priority sample in every pair, as illustrated in FIG. 2B. This ensures that the lines are tested in front-to-back order. If two or more pairs have the same priority, they are checked in order of increasing target-neighbor distance in image space. As soon as a valid intersection is found, the search is terminated and the color of the target sample is set to the line color of the pair's priority sample. For artistic flexibility, the priority may be allowed to be manually overridden.

Line Priority

When two objects with different line styles intersect, the above described algorithm will draw half of each line style on the two sides of the intersection edge. This can result in a dual-color line, which is not always desired. To avoid this, and for better artistic control, embodiments of the invention allow the user to set explicit priorities to objects. These user-set priorities take precedence over the default depth-based criterion for determining sample priority. When set, only the line of the higher-priority object will be drawn, with full width. An example is shown in FIGS. 3A-3C and 4A-4C. FIGS. 4A, 4B, and 4C show a zoomed-in view of a portion 300A, 300B, and 300C of FIGS. 3A, 3B, and 3C respectively.

Figure 4A:
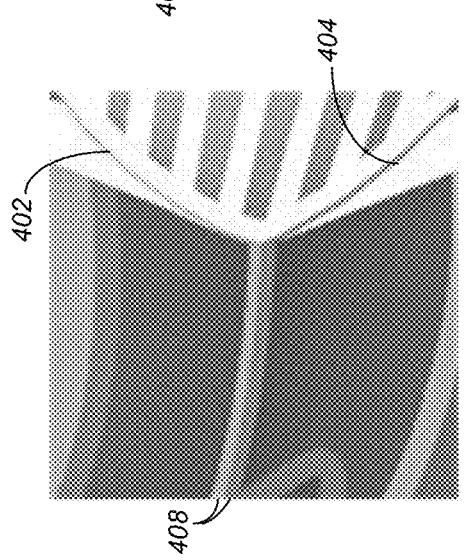
FIGS. 4A-4C show a zoomed-in view of a portion 300A, 300B, and 300C of FIGS. 3A, 3B, and 3C respectively.
Figure 4B:
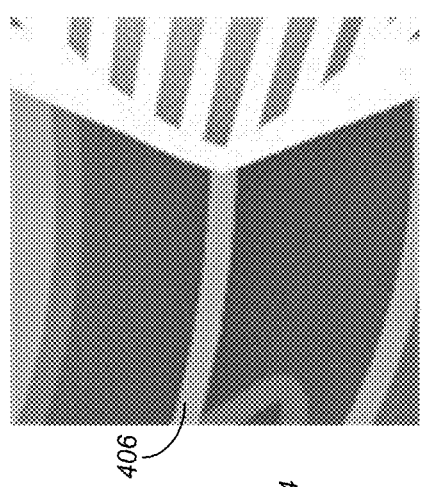
Figure 4C:
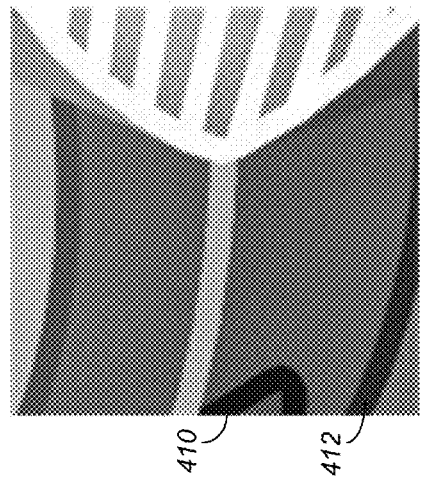

Examining FIGS. 3A and 4A, line priority is by default determined by the distance along the ray, where the shorter wins. As illustrated, line 402 is drawn in one color and line 404 is closer to a different object and displayed in a different color. When line priority is set, only the line of the higher-priority object will be drawn, with full width. Again, as illustrated in FIG. 4A, default double lines 402-404 are drawn along object intersection edges.

Figure 3B:
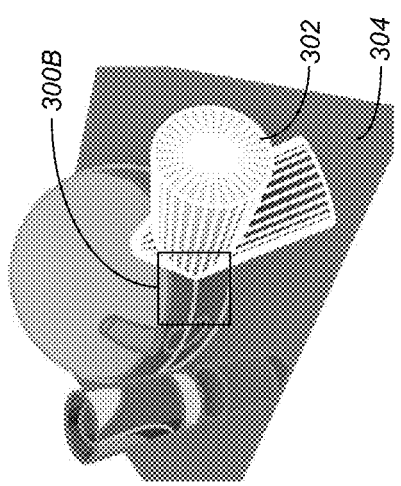

FIGS. 3B and 4B illustrate how per-object user-set priorities can be supported. In FIGS. 3B and 4B, cylinders 302 have been set with the highest priority and the ground plane 304 has the lowest. In this regard, by setting object priorities, a more pleasant look results (e.g., a single colored line 406 in FIG. 4B v. the dual colored line 408 in FIG. 4A).

Figure 3C:
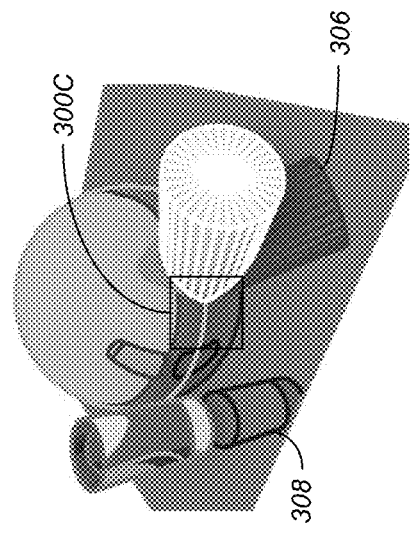

In FIGS. 3C and 4C, tinting the line colors of reflected and refracted objects can provide a more realistic result (e.g., as illustrated at 306-308, and 410-412 as discussed next).

Reflection and Refraction

Extending embodiments of the invention to draw feature lines in specular reflections and refractions is relatively straightforward. To that end, a tree of reflection and refraction events associated with every pixel sample may be stored, and feature and line attributes are recorded for every tree node. The leaves of the tree are the non-reflective/refractive ray hits where the ray recursion terminates. (For samples that hit non-reflective/refractive surfaces directly from the camera, the ray tree is made of just a single leaf node.)

Embodiments of the invention first run a feature detection algorithm on the attributes at the root node of every sample, which correspond to the primary ray hits. The samples that have not intersected a line are identified and then the same process is run again only for those samples, this time considering the reflection attributes (and refraction attributes). Samples whose primary ray hit it not a reflective surface (i.e. have null reflection attributes) are not considered. The process is repeated by considering the refraction attributes, and so on. Thus, the attribute trees of all samples are traversed in sync, in breadth-first order, such that the lines of reflected objects cover those of refracted objects.

While feature detection is performed solely in image space, by caching the throughput of the corresponding ray paths in the tree nodes the line colors can be additionally tinted to make them appear reflected or refracted. This gives more realistic results, as seen in FIGS. 3C and 4C.

Handling Thin Lines

Figure 5A:
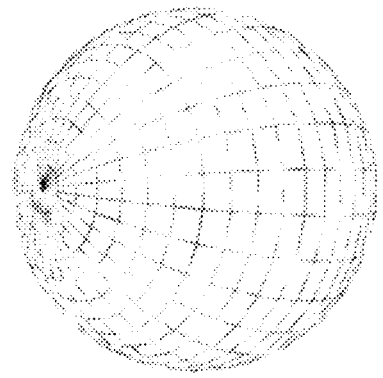
FIGS. 5A-5C illustrate lines with width driven by a noise function at 9 samples per pixel in accordance with one or more embodiments of the invention.
Figure 5B:
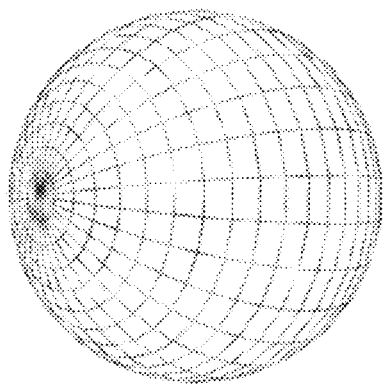
Figure 5C:
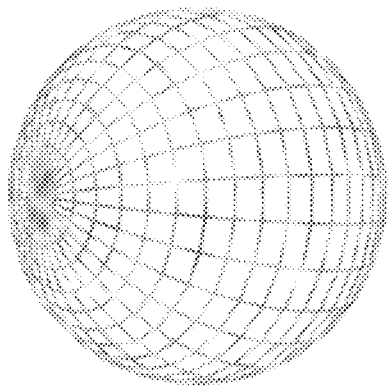

In order to draw thin contour lines without excessive noise, a minimum line width cam be optionally imposed in image space, relative to the pixel size. This technique is typically used to prevent aliasing of thin hair or grass curves by expanding their width so that they cover at least a specified distance across a pixel, and compensating for this expansion by making the curves proportionately more transparent (Cook et al. 2007 [Cook]; Georgiev et al. 2018 [Georgiev]). A similar approach is directly applicable to the contour line drawing of one or more embodiments of the invention. Excessive widening of the lines changes the look, so instead of exposing the minimum width as a user parameter, embodiments of the invention fix it to half the pixel size. FIGS. 5A-5C illustrate lines with width driven by a noise function at 9 samples/pixel in accordance with one or more embodiments of the invention. In FIG. 5A, the minimum line width is 0 pixels. In FIG. 5B, the minimum line width is 0.5 pixels. In FIG. 5C, the minimum line width is 1 pixel. As illustrated, thin lines are not captured with a minimum line width of 0 (i.e., FIG. 5A), while a minimum line width of 1 (i.e., FIG. 5C) changes the look beyond a desired amount (e.g., beyond a threshold value).

Exemplary Implementation

An exemplary implementation of embodiments of the invention provide for feature line drawing method in an Arnold production ray tracer [Georgiev et al. 2018]. Being an image-space filter, embodiments of the invention can handle complex geometry and arbitrary camera projections. Further, embodiments are also free to use any surface shader, and purpose-built shaders can provide additional feature and line-style attributes. FIGS. 6A-6E showcase exemplary capabilities of implementations in a production ray tracer (e.g., the Arnold production ray tracer) in accordance with one or more embodiments of the invention. As illustrated, the image-space methodology can efficiently render feature lines of complex ray-traced objects. Further, embodiments support arbitrary camera projections and surface shaders, specular reflection and refraction, and allow for varying the line style across surfaces. In FIG. 6A, the vehicle 600 has feature lines 602 drawn around the various objects/components of the vehicle 600. Similarly, in FIG. 6B, the robot 604 has had feature lines 606 drawn around the various object/components of the robot 604. FIG. 6C also illustrates a cartoon image 608 with various feature lines 610. Similar feature lines 612 are illustrated on the racing vehicles 614 in FIG. 6D, and feature lines 616 are illustrated on vehicle 618 in FIG. 6E. In addition, in FIG. 6E, the line style is driven by the illumination via the custom "feature color" attribute provided by the purpose-built surface shader that is applied to the car.

Figure 7:
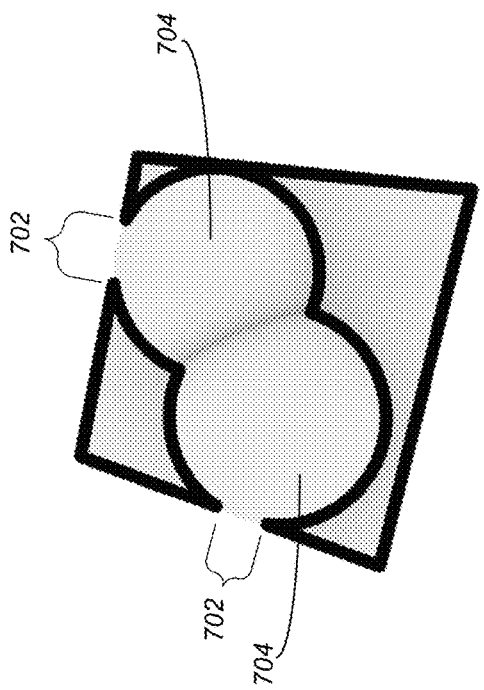
FIG. 7 illustrates a failure to draw a silhouette of a rectangle in regions where the rectangle is covered by a non-silhouette sphere in accordance with one or more embodiments of the invention.

Besides the general limitations of image-space contour drawing, lines may be missed when a no-line object is placed in front of a thick-line object and their silhouettes overlap, as seen in FIG. 7. In particular, FIG. 7 illustrates a failure to draw a silhouette of a rectangle in regions 702 where the rectangle is covered by a non-silhouette sphere 704. Embodiments of the invention may address this issue by computing the intersections of multiple objects along every ray instead of just the closest one [Wald et al. 2018]. Storing several sets of feature attributes per sample, one set for every intersected object, would enable edge detection for non-directly visible objects.

Embodiments of the invention may also address any performance drops with large numbers of neighbor samples in the stencil due to thick lines and excessively high pixel-sampling rates. For example, high sampling rates may increase the memory consumption of the per-sample attribute caching. To ameliorate this and keep memory usage low, embodiments of the invention may render and post-process the image in small tiles.

Embodiments of the invention may provide the ability to blur edges when rendering with depth of field. One option for motion blur could be to use deterministic time sampling. This would result in a stroboscopic effect that might be preferred, on top of which motion lines can be additionally drawn. Drawing dashed lines or lines with distance-varying style requires the ability to identify the lines' endpoints and to measure distances along them. Lastly, for stereoscopic viewing, embodiments of the invention may render the left- and right-eye images completely independently. Further, to overcome viewing discomfort with stereoscopic images, embodiments of the invention may draw the feature lines in a stereo-consistent way (Bukenberger et al. 2018 [Bukenberger]).

Logical Flow

Figure 8:
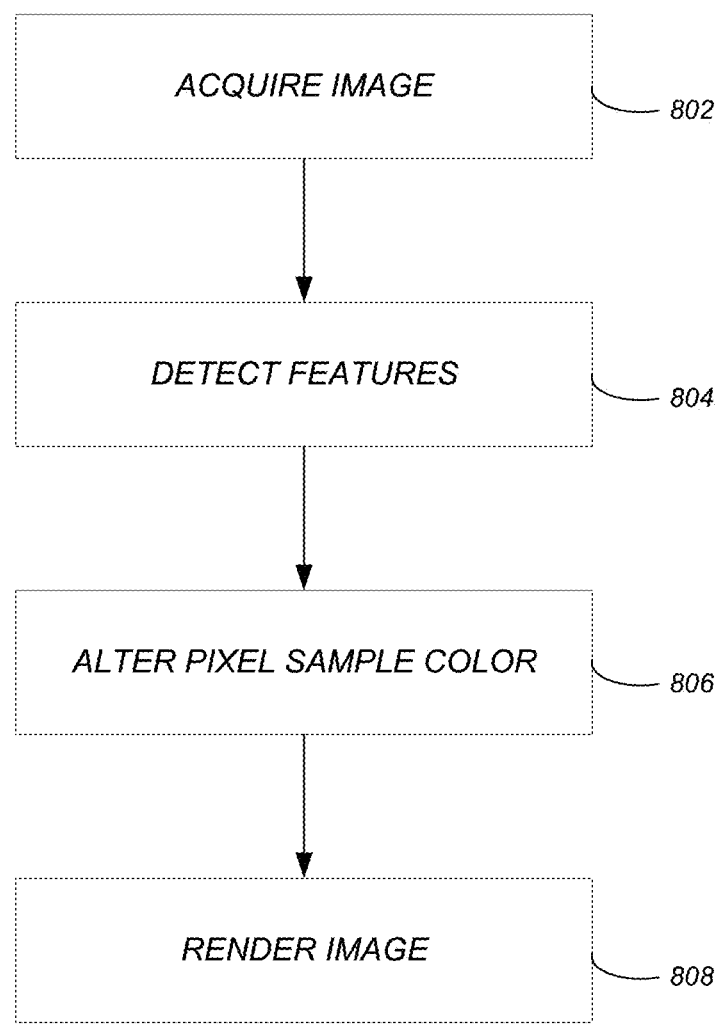
FIG. 8 illustrates the logical flow for drawing a feature line on an image in accordance with one or more embodiments of the invention.

FIG. 8 illustrates the logical flow for drawing a feature line on an image.

At step 802, the image is acquired. The image is represented as a set of pixel samples for every pixel in the image. In addition, each pixel sample consists of one or more feature attributes.

At step 804, one or more features are detected based on differences between the feature attributes. The detected features are represented by one or more pixel samples in the set of pixel samples. The feature attributes may be determined via ray tracing. Further, the feature attributes may be selected from a group consisting of an object identification (ID), a shader identification (ID), a texture coordinate, a surface normal, a depth value, and an arbitrary feature color provided by the surface shader. Alternatively, the feature attributes may consist of any one of the above-listed items. The depth value may include a ray hit distance from a camera focal point to an intersected object.

In addition to the above, the detecting may include comparing a target pixel sample (in the set of pixel samples) to neighboring pixel samples (in the set of pixel samples). Such neighboring pixel samples are within a vicinity of the target pixel sample. Further, the comparing may include comparing feature attributes of the target pixel sample to the feature attributes of the neighboring pixel samples. The vicinity may be defined/consist of a disk-shaped stencil with a diameter equal to a maximum possible line width. In addition, the comparing may find a closest line intersection at the target pixel sample by iterating over target-neighbor pairs by comparing the feature attributes of the target pixel sample to one of the neighboring pixel samples in the target-neighbor pair, in order of decreasing priority based on a depth the target pixel sample and neighboring pixel sample (in the target-neighbor pairs).

Step 804 may also include various steps relating to reflection and refraction. In particular, embodiments may store a tree of reflection and refraction events associated with each of the pixel samples. Thereafter, feature attributes and line attributes are recorded for every node in the tree, wherein leaves of the tree are non-reflective or non-refractive ray hits where a ray recursion terminates. Detecting is performed on the feature attributes at the root node of every pixel sample. The pixel samples that have not yet intersected a line are identified and the detecting is then performed on the identified pixel samples considering reflection attributes and refraction attributes (where lines of reflected objects cover refracted objects). In addition, the rendering may further include tinting line colors to appear reflected or refracted.

At step 806, a color of the pixel samples (representing the one or more detected features) are altered as described herein.

At step 808, the image is rendered based on the pixel samples including the altered color. The feature line that is drawn consists of the altered color. In addition, the feature line may impose/consist of a minimum line width.

Hardware Embodiments

Figure 9:
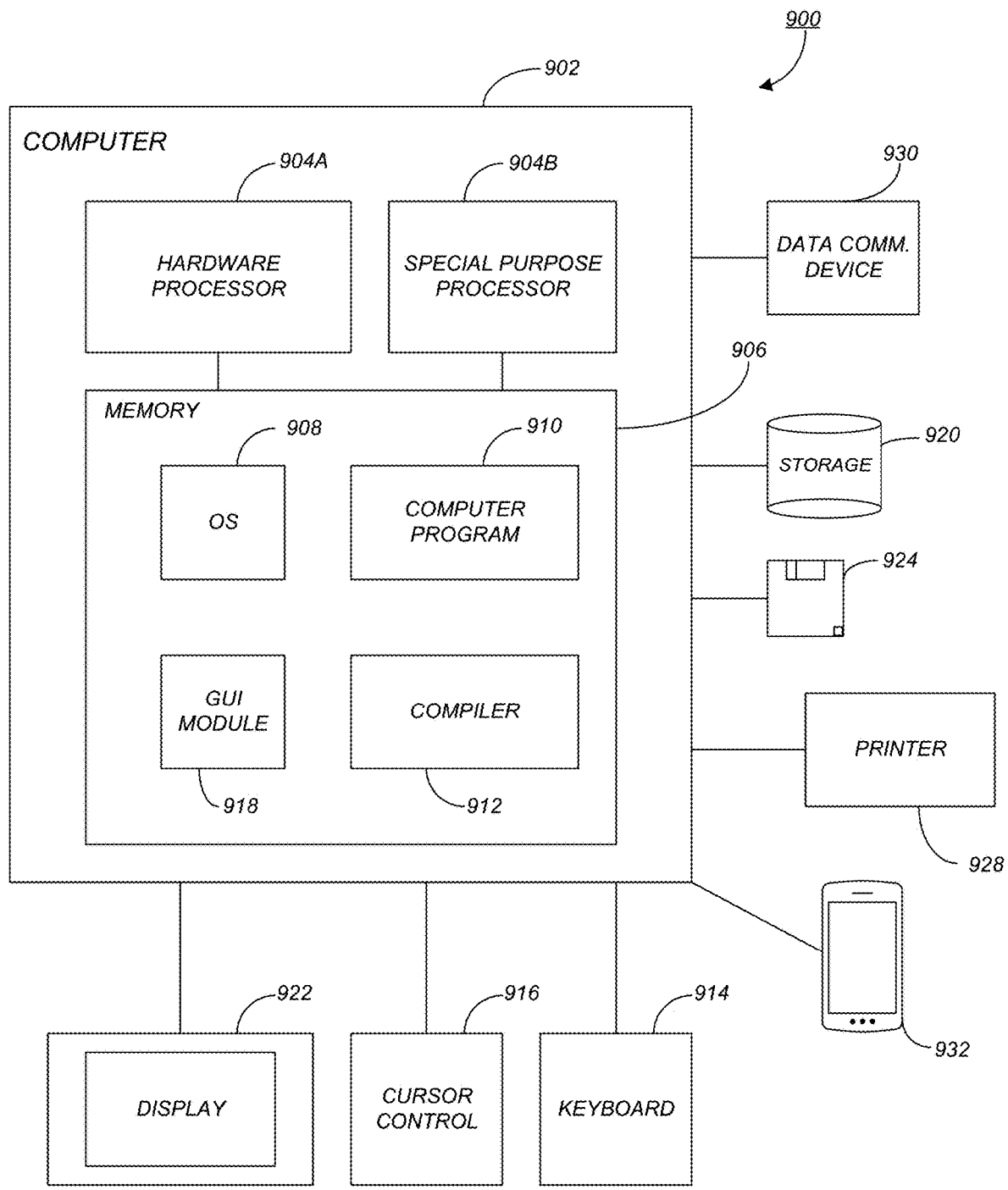
FIG. 9 is an exemplary hardware and software environment used to implement one or more embodiments of the invention.

FIG. 9 is an exemplary hardware and software environment 900 (referred to as a computer-implemented system and/or computer-implemented method) used to implement one or more embodiments of the invention. The hardware and software environment includes a computer 902 and may include peripherals. Computer 902 may be a user/client computer, server computer, or may be a database computer. The computer 902 comprises a hardware processor 904A and/or a special purpose hardware processor 904B (hereinafter alternatively collectively referred to as processor 904) and a memory 906, such as random access memory (RAM). The computer 902 may be coupled to, and/or integrated with, other devices, including input/output (I/O) devices such as a keyboard 914, a cursor control device 916 (e.g., a mouse, a pointing device, pen and tablet, touch screen, multi-touch device, etc.) and a printer 928. In one or more embodiments, computer 902 may be coupled to, or may comprise, a portable or media viewing/listening device 932 (e.g., an MP3 player, IPOD, NOOK, portable digital video player, cellular device, personal digital assistant, etc.). In yet another embodiment, the computer 902 may comprise a multi-touch device, mobile phone, gaming system, internet enabled television, television set top box, or other internet enabled device executing on various platforms and operating systems.

In one embodiment, the computer 902 operates by the hardware processor 904A performing instructions defined by the computer program 910 (e.g., a computer-aided design [CAD] application) under control of an operating system 908. The computer program 910 and/or the operating system 908 may be stored in the memory 906 and may interface with the user and/or other devices to accept input and commands and, based on such input and commands and the instructions defined by the computer program 910 and operating system 908, to provide output and results.

Output/results may be presented on the display 922 or provided to another device for presentation or further processing or action. In one embodiment, the display 922 comprises a liquid crystal display (LCD) having a plurality of separately addressable liquid crystals. Alternatively, the display 922 may comprise a light emitting diode (LED) display having clusters of red, green and blue diodes driven together to form full-color pixels. Each liquid crystal or pixel of the display 922 changes to an opaque or translucent state to form a part of the image on the display in response to the data or information generated by the processor 904 from the application of the instructions of the computer program 910 and/or operating system 908 to the input and commands. The image may be provided through a graphical user interface (GUI) module 918. Although the GUI module 918 is depicted as a separate module, the instructions performing the GUI functions can be resident or distributed in the operating system 908, the computer program 910, or implemented with special purpose memory and processors.

In one or more embodiments, the display 922 is integrated with/into the computer 902 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITHC, PLAYSTATION PORTABLE, etc.), touch tables, and walls (e.g., where an image is projected through acrylic and/or glass, and the image is then backlit with LEDs).

Some or all of the operations performed by the computer 902 according to the computer program 910 instructions may be implemented in a special purpose processor 904B. In this embodiment, some or all of the computer program 910 instructions may be implemented via firmware instructions stored in a read only memory (ROM), a programmable read only memory (PROM) or flash memory within the special purpose processor 904B or in memory 906. The special purpose processor 904B may also be hardwired through circuit design to perform some or all of the operations to implement the present invention. Further, the special purpose processor 904B may be a hybrid processor, which includes dedicated circuitry for performing a subset of functions, and other circuits for performing more general functions such as responding to computer program 910 instructions. In one embodiment, the special purpose processor 904B is an application specific integrated circuit (ASIC).

The computer 902 may also implement a compiler 912 that allows an application or computer program 910 written in a programming language such as C, C++, Assembly, SQL, PYTHON, PROLOG, MATLAB, RUBY, RAILS, HASKELL, or other language to be translated into processor 904 readable code. Alternatively, the compiler 912 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 910 accesses and manipulates data accepted from I/O devices and stored in the memory 906 of the computer 902 using the relationships and logic that were generated using the compiler 912.

The computer 902 also optionally comprises an external communication device such as a modem, satellite link, Ethernet card, or other device for accepting input from, and providing output to, other computers 902.

In one embodiment, instructions implementing the operating system 908, the computer program 910, and the compiler 912 are tangibly embodied in a non-transitory computer-readable medium, e.g., data storage device 920, which could include one or more fixed or removable data storage devices, such as a zip drive, floppy disc drive 924, hard drive, CD-ROM drive, tape drive, etc. Further, the operating system 908 and the computer program 910 are comprised of computer program 910 instructions which, when accessed, read and executed by the computer 902, cause the computer 902 to perform the steps necessary to implement and/or use the present invention or to load the program of instructions into a memory 906, thus creating a special purpose data structure causing the computer 902 to operate as a specially programmed computer executing the method steps described herein. Computer program 910 and/or operating instructions may also be tangibly embodied in memory 906 and/or data communications devices 930, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 902.

Figure 10:
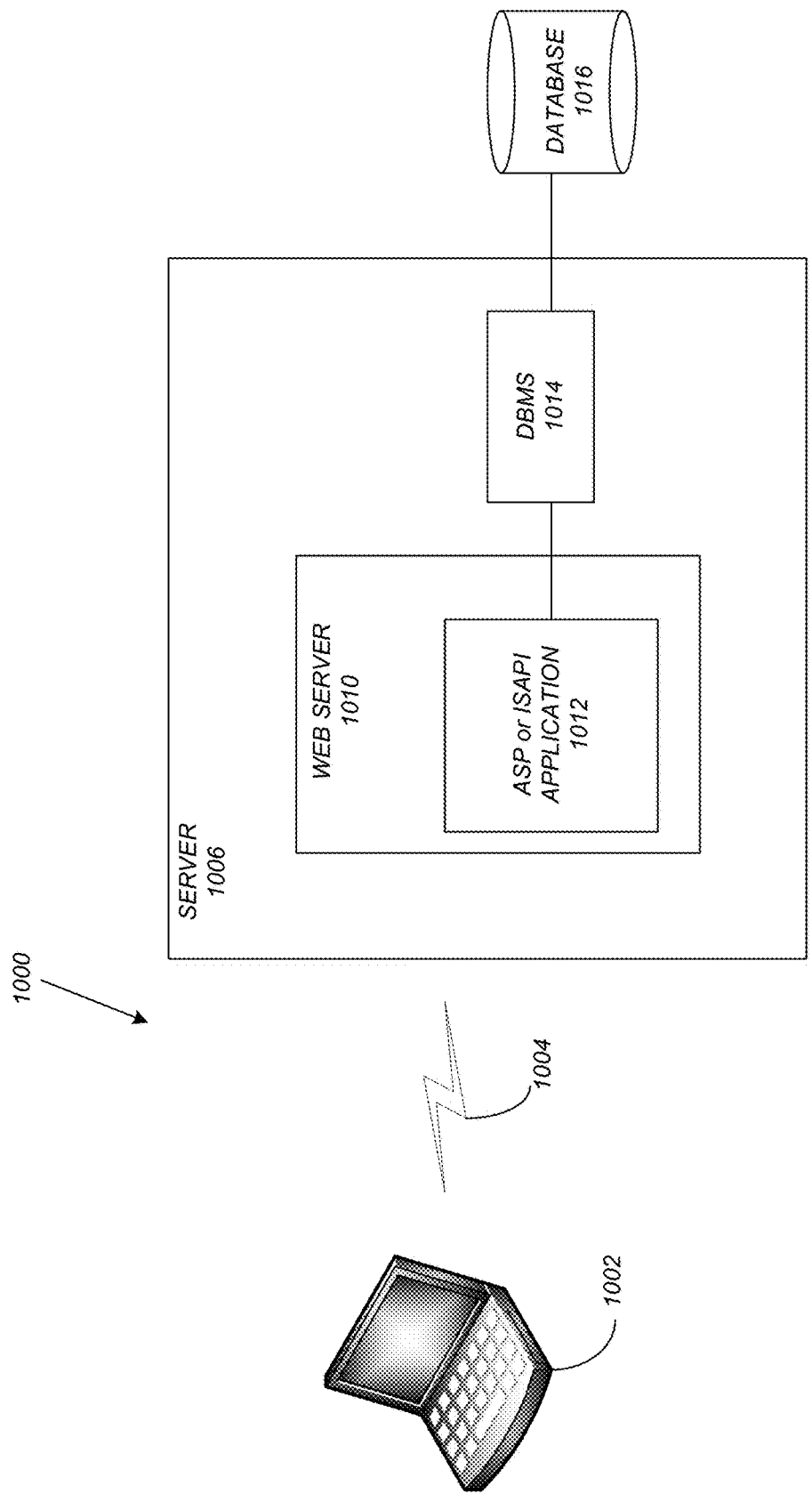
FIG. 10 schematically illustrates a typical distributed/cloud-based computer system using a network to connect client computers to server computers in accordance with one or more embodiments of the invention.

FIG. 10 schematically illustrates a typical distributed/cloud-based computer system 1000 using a network 1004 to connect client computers 1002 to server computers 1006. A typical combination of resources may include a network 1004 comprising the Internet, LANs (local area networks), WANs (wide area networks), SNA (systems network architecture) networks, or the like, clients 1002 that are personal computers or workstations (as set forth in FIG. 9), and servers 1006 that are personal computers, workstations, minicomputers, or mainframes (as set forth in FIG. 9). However, it may be noted that different networks such as a cellular network (e.g., GSM [global system for mobile communications] or otherwise), a satellite based network, or any other type of network may be used to connect clients 1002 and servers 1006 in accordance with embodiments of the invention.

A network 1004 such as the Internet connects clients 1002 to server computers 1006. Network 1004 may utilize ethernet, coaxial cable, wireless communications, radio frequency (RF), etc. to connect and provide the communication between clients 1002 and servers 1006. Further, in a cloud-based computing system, resources (e.g., storage, processors, applications, memory, infrastructure, etc.) in clients 1002 and server computers 1006 may be shared by clients 1002, server computers 1006, and users across one or more networks. Resources may be shared by multiple users and can be dynamically reallocated per demand. In this regard, cloud computing may be referred to as a model for enabling access to a shared pool of configurable computing resources.

Clients 1002 may execute a client application or web browser and communicate with server computers 1006 executing web servers 1010. Such a web browser is typically a program such as MICROSOFT INTERNET EXPLORER/ EDGE, MOZILLA FIREFOX, OPERA, APPLE SAFARI, GOOGLE CHROME, etc. Further, the software executing on clients 1002 may be downloaded from server computer 1006 to client computers 1002 and installed as a plug-in or ACTIVEX control of a web browser. Accordingly, clients 1002 may utilize ACTIVEX components/component object model (COM) or distributed COM (DCOM) components to provide a user interface on a display of client 1002. The web server 1010 is typically a program such as MICROSOFT'S INTERNET INFORMATION SERVER.

Web server 1010 may host an Active Server Page (ASP) or Internet Server Application Programming Interface (ISAPI) application 1012, which may be executing scripts. The scripts invoke objects that execute business logic (referred to as business objects). The business objects then manipulate data in database 1016 through a database management system (DBMS) 1014. Alternatively, database 1016 may be part of, or connected directly to, client 1002 instead of communicating/obtaining the information from database 1016 across network 1004. When a developer encapsulates the business functionality into objects, the system may be referred to as a component object model (COM) system. Accordingly, the scripts executing on web server 1010 (and/or application 1012) invoke COM objects that implement the business logic. Further, server 1006 may utilize MICROSOFT'S TRANSACTION SERVER (MTS) to access required data stored in database 1016 via an interface such as ADO (Active Data Objects), OLE DB (Object Linking and Embedding DataBase), or ODBC (Open DataBase Connectivity).

Generally, these components 1000-1016 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/ or data, when read, executed, and/or interpreted, results in the steps necessary to implement and/or use the present invention being performed.

Although the terms "user computer", "client computer", and/or "server computer" are referred to herein, it is understood that such computers 1002 and 1006 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1002 and 1006. Embodiments of the invention are implemented as a software/CAD application on a client 1002 or server computer 1006. Further, as described above, the client 1002 or server computer 1006 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

Some exemplary differences from the prior art include effectively simplifying a feature detection metric to a Boolean decision, adding support for surface-varying line styles, and avoiding expensive additional probe ray shooting. Additional exemplary difference include considering all sampling data at once to maximize the quality of the contours and their intersections, and utilizing an image-space method that allows for varying the line style and also supports ray-traced reflection and refraction.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[Bauer] Andreas Bauer. 2017. A New Contour Method for Highly Detailed Geometry. In *ACM SIGGRAPH* 2017 *Talks (SIGGRAPH '17)*. ACM, New York, N.Y., USA, Article 71, 2 pages.

[Bukenberger] Dennis R. Bukenberger, Katharina Schwarz, and Hendrik P. A. Lensch. 2018. Stereo-Consistent Contours in Object Space. *Comput. Graph. Forum* 37, 1 (2018), 301-312.

[Choudhury] A. N. M. Imroz Choudhury and Steven G. Parker. 2009. Ray Tracing NPR-style Fea-ture Lines. In *Proceedings of the 7th International Symposium on Non-Photorealistic Animation and Rendering (NPAR '09)*. ACM, New York, N.Y., USA, 5-14.

[Cook] Robert L. Cook, John Halstead, Maxwell Planck, and David Ryu. 2007. Stochastic Simplification of Aggregate Detail. *ACM Transactions on Graphics* 26, 3 (2007).

[Georgiev] Iliyan Georgiev, Thiago Ize, Mike Farnsworth, Ramón Montoya-Vozmediano, Alan King, Brecht Van Lommel, Angel Jimenez, Oscar Anson, Shinji Ogaki, Eric Johnston, Adrien Herubel, Declan Russell, Frédéric Servant, and Marcos Fajardo. 2018. Arnold: A Brute-Force Production Path Tracer. *ACM Trans. Graph.* 37, 3, Article 32 (August 2018), 12 pages.

[Grabli] Stéphane Grabli, Emmanuel Turquin, Frédo Durand, and François X. Sillion. 2004. Pro-grammable Style for NPR Line Drawing. In *Proceedings of the Fifteenth Eurographics Conference on Rendering Techniques (EGSR '04)*. Eurographics Association, Aire-la-Ville, Switzerland, Switzerland, 33-44.

[Hertzmann] Aaron Hertzmann and Denis Zorin. 2000. Illustrating Smooth Surfaces. In *Proceedings of the 27th Annual Conference on Computer Graphics and Interactive Techniques (SIGGRAPH '00)*. ACM Press/Addison-Wesley Publishing Co., New York, N.Y., USA, 517-526.

[Kim] Yongjin Kim, Jingyi Yu, Xuan Yu, and Seungyong Lee. 2008. Line-art Illustration of Dynamic and Specular Surfaces. In *ACM SIGGRAPH Asia* 2008 *Papers (SIGGRAPH Asia '08)*. ACM, New York, N.Y., USA, Article 156, 10 pages.

[Wald] Ingo Wald, Jefferson Amstutz, and Carsten Benthin. 2018. Robust Iterative Find-Next-Hit Ray Traversal. In *Eurographics Symposium on Parallel Graphics and Visualization*, Hank Childs and Fernando Cucchietti (Eds.). The Eurographics Association.

What is claimed is:

1. A computer-implemented method for drawing a feature line on an image, comprising:

(a) acquiring the image, wherein:
  (1) the image is represented as a pixel sample set comprising multiple pixel samples for every pixel in the image;
  (2) each pixel sample in the pixel sample set comprises one or more feature attributes; and
  (3) acquiring the image comprises generating the multiple pixel samples by ray tracing;
(b) detecting one or more features based on differences between the feature attributes, wherein:
  (1) the detected one or more features are represented by one or more feature pixel samples of the multiple pixel samples in the pixel sample set; and
  (2) the detecting comprises testing, in image space, each pixel sample in the pixel sample set for an intersection with the feature line;
(c) altering a color of the one or more feature pixel samples; and
(d) rendering the image based on the multiple pixel samples in the pixel sample set including the altered color of the feature pixel samples, wherein the feature line comprises the altered color.

2. The computer-implemented method of claim 1, wherein the feature attributes are determined via ray tracing.

3. The computer-implemented method of claim 1, wherein the feature attributes are selected from a group consisting of:
  object ID;
  shader ID;
  texture coordinate;
  surface normal;
  a depth value; and
  an arbitrary feature color provided by a surface shader.

4. The method of claim 3, wherein the depth value comprises a ray hit distance from a camera focal point to an intersected object.

5. The computer-implemented method of claim 1, wherein the detecting comprises:
  comparing a target pixel sample in the pixel sample set to neighboring pixel samples, in the pixel sample set, wherein the neighboring pixel samples are within a vicinity of the target pixel sample, wherein the comparing comprises comparing the feature attributes of the target pixel sample to the feature attributes of the neighboring pixel samples.

6. The computer-implemented method of claim 5, wherein:
  the vicinity comprises a disk-shaped stencil with a diameter equal to a maximum possible line width.

7. The computer-implemented method of claim 5, wherein:
  the comparing finds a closest line intersection at the target pixel sample by iterating over target-neighbor pairs by comparing the feature attributes of the target pixel sample to one of the neighboring pixel samples in the target-neighbor pairs, in order of decreasing priority based on a depth the target pixel sample and neighboring pixel sample in the target-neighbor pairs.

8. The computer-implemented method of claim 1, further comprising:
  storing a tree of reflection and refraction events associated with each of the pixel samples;
  recording feature attributes and line attributes for every node in the tree, wherein leaves of the tree comprise non-reflective or non-refractive ray hits where a ray recursion terminates;
  performing the detecting on the feature attributes at the root node of every pixel sample;
  identifying the pixel samples that have not yet intersected a line and performing the detecting on the identified pixel samples considering reflection attributes and refraction attributes, wherein lines of reflected objects cover refracted objects.

9. The computer-implemented method of claim 8, wherein the rendering further comprises tinting line colors to appear reflected or refracted.

10. The computer-implemented method of claim 1, wherein the feature line imposes a minimum line width.

11. A computer-implemented system for drawing a feature line on an image, comprising:
  (a) a computer having a memory;
  (b) a processor executing on the computer;
  (c) the memory storing a set of instructions, wherein the set of instructions, when executed by the processor cause the processor to perform operations comprising:
    (i) acquiring the image, wherein:
      (1) the image is represented as a pixel sample set comprising multiple pixel samples for every pixel in the image;
      (2) each pixel sample in the pixel sample set comprises one or more feature attributes;
    (ii) detecting one or more features based on differences between the feature attributes, wherein:
      (1) the detected one or more features are represented by one or more feature pixel samples of the multiple pixel samples in the pixel sample set; and
      (2) the detecting comprises testing, in image space, each pixel sample in the pixel sample set for an intersection with the feature line;
    (iii) altering a color of the one or more feature pixel samples; and
    (iv) rendering the image based on the multiple pixel samples in the pixel sample set including the altered color of the feature pixel samples, wherein the feature line comprises the altered color.

12. The computer-implemented system of claim 11, wherein the feature attributes are determined via ray tracing.

13. The computer-implemented system of claim 11, wherein the feature attributes are selected from a group consisting of:
  object ID;
  shader ID;
  texture coordinate;
  surface normal;
  a depth value; and
  an arbitrary feature color provided by a surface shader.

14. The method of claim 13, wherein the depth value comprises a ray hit distance from a camera focal point to an intersected object.

15. The computer-implemented system of claim 11, wherein the detecting comprises:
  comparing a target pixel sample in the pixel sample set to neighboring pixel samples, in the pixel sample set, wherein the neighboring pixel samples are within a vicinity of the target pixel sample, wherein the comparing comprises comparing the feature attributes of the target pixel sample to the feature attributes of the neighboring pixel samples.

16. The computer-implemented system of claim 15, wherein:
  the vicinity comprises a disk-shaped stencil with a diameter equal to a maximum possible line width.

17. The computer-implemented system of claim 15, wherein:
  the comparing finds a closest line intersection at the target pixel sample by iterating over target-neighbor pairs by comparing the feature attributes of the target pixel sample to one of the neighboring pixel samples in the target-neighbor pairs, in order of decreasing priority based on a depth the target pixel sample and neighboring pixel sample in the target-neighbor pairs.

18. The computer-implemented system of claim 11, wherein the operations further comprise:
  storing a tree of reflection and refraction events associated with each of the pixel samples;
  recording feature attributes and line attributes for every node in the tree, wherein leaves of the tree comprise non-reflective or non-refractive ray hits where a ray recursion terminates;
  performing the detecting on the feature attributes at the root node of every pixel sample;
  identifying the pixel samples that have not yet intersected a line and performing the detecting on the identified pixel samples considering reflection attributes and refraction attributes, wherein lines of reflected objects cover refracted objects.

19. The computer-implemented system of claim 18, wherein the rendering further comprises tinting line colors to appear reflected or refracted.

20. The computer-implemented system of claim 11, wherein the feature line imposes a minimum line width.

* * * * *